United States Patent [19]

Cohen et al.

[11] 3,900,469

[45] Aug. 19, 1975

[54] 7-OXA-3-THIA-1-AZA SPIRO[5,5]UNDEC-1-ENE

[75] Inventors: Noal Cohen, Montclair, N.J.; Wijitha De Silva, Niedersteinmaur; Gerhard Hueppi, Gockhausen, both of Switzerland

[73] Assignee: Hoffmann-La Roche Inc., Nutley, N.J.

[22] Filed: July 3, 1974

[21] Appl. No.: 485,653

[52] U.S. Cl................................. 260/243 R; 71/90
[51] Int. Cl.².................................... C07D 279/06
[58] Field of Search ............................ 260/243 R

[56] References Cited
OTHER PUBLICATIONS
*Chemical Abstracts*, Chemical Substance Index, July–Dec. 1973, p. 3563CS, QD 1, A51.

*Primary Examiner*—John M. Ford
*Attorney, Agent, or Firm*—Samuel L. Welt; Jon S. Saxe; George M. Gould

[57] ABSTRACT

Compounds of the formula

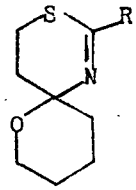

I wherein R is phenyl; phenyl monosubstituted with a chloro, lower alkyl or lower alkoxy group; or pyridyl; and the acid addition salts thereof exhibit plant growth regulant activity, particularly when applied pre-emergence.

7 Claims, No Drawings

7-OXA-3-THIA-1-AZA APIRO[5,5]UNDEC-1-ENE

BRIEF DESCRIPTION OF THE INVENTION

The present invention is directed to novel compounds of the formula

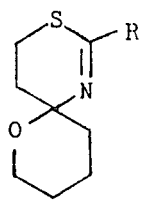

I wherein R is phenyl; phenyl monosubstituted with a chloro, lower alkyl or lower alkoxy group; or pyridyl; and the acid addition salts thereof.

These compounds are conveniently referred to as spirothiazines.

In the specification, as well as the appended claims, the term "lower alkyl" refers to a monovalent saturated straight or branched-chain hydrocarbon substituent of from 1 to 5 carbon atoms. Examples of lower alkyl groups are methyl, ethyl, n-propyl, i-propyl, n-butyl, t-butyl, t-amyl, and so forth. The term "lower alkoxy group" refers to one of the aforementioned lower alkyl groups linked through an ether oxygen, having its free valence from the ether oxygen. Examples of lower alkoxy groups are methoxy, ethoxy, n-propoxy, i-propoxy, n-butoxy, t-butoxy, t-amyloxy, and so forth.

Among the compounds of formula I which may be prepared as hereinafter described are:

2-phenyl-7-oxa-3-thia-1-azaspiro[5.5]undec-1-ene
2-(2-chlorophenyl)-7-oxa-3thia-1-azaspiro[5.5]undec-1-ene
2-(3-chlorophenyl)-7-oxa-3-thia-1-azaspiro[5.5]undec-1-ene
2-(4-chlorophenyl)-7-oxa-3-thia-1-azaspiro[5.5]undec-1-ene
2-(2-methylphenyl)-7-oxa-3-thia-1-azaspiro[5.5]undec-1-ene
2-(3-methylphenyl)-7-oxa-3-thia-1-azaspiro[5.5]undec-1-ene
2-(4-methylphenyl)-7-oxa-3-thia-1-azaspiro[5.5]undec-1-ene
2-(4-ethylphenyl)-7-oxa-3-thia-1-azaspiro[5.5]undec-1-ene
2-(4-n-butylphenyl)-7-oxa-3-thia-1-azaspiro[5.5]undec-1-ene
2-(4-t-butylphenyl)-7-oxa-3-thia-1-azaspiro[5.5]undec-1-ene
2-(2-methoxyphenyl)-7-oxa-3-thia-1-azaspiro[5.-5]undec-1-ene
2-(3-methoxyphenyl)-7-oxa-3-thia-1-azaspiro[5.-5]undec-1-ene
2-(4-methoxyphenyl)-7-oxa-3-thia-1-azaspiro[5.-5]undec-1-ene
2-(4-ethoxyphenyl)-7-oxa-3-thia-1-azaspiro[5.5]undec-1-ene
2-(4-n-butoxyphenyl)-7-oxa-3-thia-1-azaspiro[5.-5]undec-1-ene
2-(4-i-propoxyphenyl)-7-oxa-3-thia-1-azaspiro[5.-5]undec-1-ene
2-pyridyl-7-oxa-3-thia-1-azaspiro[5.5]undec-1-ene An especially preferred compound is 2-phenyl-7-oxa-3-thia-1-azaspiro[5.5]undec-1-ene and its acid addition salts, especially the hydrochloride.

The spirothiazines of the present invention are readily prepared by reaction of a substituted thiobenzamide or thio-nicotinamide of the formula

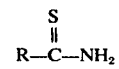

II wherein R is as above,
with a Mannich base of the formula

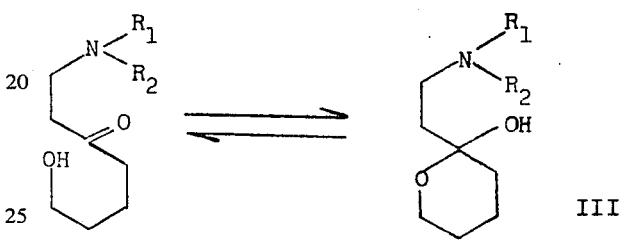

III wherein $R_1$ and $R_2$ taken independently are each lower alkyl, and $R_1$ and $R_2$ taken together are lower alkylene of from 4 to 6 carbon atoms.

The starting thiobenzamides or thionicotinamides of formula II are compounds that are commercially available or are readily prepared by methods known per se. The Mannich bases of formula III are known in the prior art, for example, in U.S. Pat. No. 3,763,155; and in references cited therein.

The preparation of compounds of formula I from those of formulas II and III is suitably carried out by heating the aforesaid compounds in an inert organic solvent in the presence of an organic carboxylic acid. Suitable inert organic solvents include hydrocarbons, e.g., hexane, heptane, benzene, toluene and xylene; ethers, e.g., tetrahydrofuran and dioxane; and so forth. Particularly preferred solvents are aromatic hydrocarbons such as toluene and xylene.

Suitable organic carboxylic acids include, for example, acetic acid, propionic acid and so forth. Glacial acetic acid is particularly preferred.

The reaction is carried out at an elevated temperature from about 50° to about 150°C, most preferably at the reflux point of the solvent medium.

After the aforesaid reaction, the compounds of formula I are obtained as their acid addition salts. The free amines of formula I may be obtained by neutralization of the acid addition salts with strong base, and isolation by the usual procedures, such as, for example, extraction.

Alternate syntheses for compounds of formula I parallel those described in U.S. Pat. No. 3,763,155 for the preparation of aminospirothiazines, by substituting a thiobenzamide or thionicotinamide for thiourea.

The free bases of formula I may be converted to acid addition salts using acids well known in the art. Such acids include, for example, mineral acids, e.g., hydrochloric acid, sulfuric acid and hydrobromic acid; organic carboxylic acids, e.g., acetic acid, tartaric acid, maleic acid, citric acid, and so forth. Preparation of these acid addition salts is accomplished by methods known per se for the preparation of acid addition salts of organic amines.

The active compounds of formula I are useful in compositions for pre- and/or post-emergence growth regulation of grasses and weeds, as well as other undesired plants. The compounds of formula I are particularly useful as pre-emergence growth regulants, especially as herbicides.

As used herein "plant growth regulant" means a compound or a composition which affects the maturation and metabolism of plants. As particularly applied to undesired grasses and weeds, the term refers to the stimulation or retardation of growth of main or side shoots of plants. Such activity may amount to herbicidal activity. As applied to pre-emergence control, plant growth regulation refers to the prevention of significant visible plant growth above the soil level. For example, the compounds of formula I are useful in the control of *Echinochloa crus-galli*, *Agrostis stolonifera*, *Apera spica-venti*, *Digitaria sanguinalis*, *Panicum capillare*, and *Setaria glauca*. The present compounds have little, if any, injurious effect towards desired crops such as barley, rice, sorghum, onion, sunflower, cucumber, cotton, flax, peanut, potato, sugarbeet, and soyabean.

The compounds of the present invention may be utilized as active ingredients in various compositions, such as, for example, in solutions containing water and water miscible organic solvents, e.g., acetone; in suspensions or emulsions containing, for example, surface active agents such as wetting agents, dispersing agents, emulsifying agents and the like, in sufficient amounts to impart the desired characteristics to the formulation. Aqueous suspensions of wettable powders containing as active ingredients a compound of formula I are preferred compositions.

The compositions may be varied by one skilled in the art according to the desired method of application, the particular use and result desired.

The biological spectrum of the present compounds may be broadened by the addition of substances having, for example, bacteriocidal, herbicidal and fungicidal properties, and also by combination with, for example, fertilizers, chelating agents and other plant growth regulators.

The compounds of the present invention should be present in the composition in an effective plant growth regulating quantity. Suitable effective quantities are from about 0.1 to about 50% by weight of the formulation. Particularly preferred percentages by weight are in the range of 0.2 to 5%. The amount of active ingredient will vary according to the plants to be controlled, the requisite application rate, type of application, the active compound used and the control desired. Basically, the amount of active ingredient and the type and frequency of application will be such that will provide effective plant growth regulant control. However, the compounds of the present invention have particularly preferred utility when applied at a dosage of from about 0.5 to about 20 kg per hectare.

A further appreciation of the compounds and methods of the present invention may be obtained from the following examples:

EXAMPLE 1

The substituted thiobenzamides were prepared according to one of the following methods:
1. E. C. Taylor, et al., *J.A.C.S.*, 82, 2656 (1961)
2. K. Kindler, *Ann.*, 431, 187 (1923)
3. P. Chabrier, *Bull. Soc. Chim. France*, 1949, 273

| | | |
|---|---|---|
| 4-chloro | - method 3 | - m.p. 120–122°C |
| 4-methyl | - method 2 | - m.p. 157–160°C |
| 3-chloro | - known | - m.p. 108–110°C |
| 4-methoxy | - method 3 | - m.p. 140–143°C | thionicotinamide is commercially available.

EXAMPLE 2

General procedure for preparation of spirothiazines

A mixture of 20 g (0.1 mole) of 2(2-diethylaminoethyl)-2-hydroxytetrahydropyran, 14 g (0.102 mole) of thiobenzamide, 300 ml of toluene and 100 ml of glacial acetic acid was stirred and heated at reflux for 3 hr then concentrated at reduced pressure. The residue was treated with 3 N aqueous hydrochloric acid and the neutral impurities were removed by extraction with ether. The aqueous acidic solution was then made alkaline with 10% aqueous sodium hydroxide and the product was isolated by extraction with methylene chloride giving 14.0 g of orange oil.

This material was chromatographed on 400 g of silica gel. Elution with 19:1 benzene:ether gave 8.0 g of pure 2-phenyl-7oxa-3-thia-1-azaspiro[5.5]undec-1-ene as an orange oil; ir (CHCl$_3$) 1605, 1590, 1100, 1045, 1000 cm$^{-1}$; uv max (95% EtOH) 239 nm ($\epsilon$13100); nmr (CDCl$_3$)$\delta$7.82 (m, 2), 7.39 (m, 3), 4.47 (m, 1), 3.70 (m, 1), 3.15 (m, 2), 1.74 ppm (m, 8); ms m/e 247 (M$^+$), 219, 144, 111, 98, 55.

Anal. Calcd for C$_{14}$H$_{17}$ NOS: C, 67.98; H, 6.93; N, 5.66; S, 12.96. Found: C, 67.71; H, 6.96; N, 5.58; S, 12.85.

The hydrochloride was prepared by treatment of the base with dry HCl gas in ether. Recrystallization of the resulting solid from acetone gave colorless crystals, mp 134°–136°d; uv max (95% EtOH) 239 nm ($\epsilon$15200).

Anal. Calcd. for C$_{14}$H$_{17}$NOS.HCl: NOS:HCl: C, 59.26; H, 6.39; N, 4.99. Found: C, 58.99; H, 6.43; N, 4.98.

Following the above procedure, including chromatography on silica gel and elution with ethyl acetate:-benzene (1:4), followed by distillation in a Kugelrohr oven, there were prepared the following spirothiazines:

2-(3-chlorophenyl)-7-oxa-3-thia-1-azaspiro[5.5]undec-1ene, b.p. 78°/0.005 mm

Calcd. for C$_{14}$H$_{16}$ClNOS: C, 59.67; H, 5.77; N, 4.97; S, 11.38; Cl, 12.58. Found: C, 60.13; H, 5.85; N, 4.54; S, 10.96; Cl, 12.01.

2-(4-methoxyphenyl)-7-oxa-3-thia-1-azaspiro[5.5]undec-1-ene, b.p. 83°–84°/0.005 mm Calcd. for C$_{15}$H$_{19}$NO$_2$S: C, 64.95; H, 6.90; N, 5.05. Found: C, 65.19; H, 7.07; N, 4.64.

2-(4-chlorophenyl)-7-oxa-3-thia-1-azaspiro[5.5]undec-1-ene, b.p. 92°/0.001 mm

Calcd. for C$_{14}$H$_{16}$ClNOS: C, 59.67; H, 5.72; N, 4.97; S, 11.38; Cl, 12.58. Found: C, 60.05; H, 5.89N, 4.85; S, 11.03; Cl, 12.18.

2-(4-tolyl)-7-oxa-3-thia-1-azaspiro[5.5.]undec-1-ene, b.p. 76°–78°/0.001 mm
Calcd. for $C_{15}H_{19}NOS$: C, 68.93; H, 7.33; N, 5.36; S, 12.27. Found C, 69.13; H, 7.57; N, 4.85; S, 11.24.
2(3-pyridyl)-7oxa-3-thia-1-azaspiro[5.5]undec-1-ene, b.p. 68°–72°/0.02 mm
Calcd. for $C_{13}H_{16}N_2OS$: C, 62.87; H, 6.49; N, 11.28; S, 12.91. Found C, 62.32; H, 6.67; N, 10.46; S, 11.87.

EXAMPLE 3

% Kill of Echinochloa Crus-galli (barnyard grass) with Pre-emergence Herbicide Application Seeds of the test plants are sown in potting compost in 450 ml plastic pots. Before and after spraying, the plants are kept in the greenhouse. Daylight is supplemented if necessary by mercury vapor lamps to make a 16-hour day.

The spirothiazines were applied in a spray volume of 1000 l./hectare. Results, expressed as % kill, were assessed 3 weeks after treatment.

Formulations

| | | |
|---|---|---|
| 25 % w/w | active ingredient | |
| 63 % w/w | Kaolin | |
| 7.5 % w/w | Ekapercol N-sodium dinaphthyl methane disulfonate | |
| 2.25 % w/w | Imbentin N-52-nonylphenyl ethylene oxide adduct | |
| 0.75 % w/w | Tylose SL 600-carboxymethyl cellulose | |
| 0.15 % w/w | Sodium oleate | |

40 kg of wettable powder was suspended in water to make 1000 liters for application.

| | | |
|---|---|---|
| (b) | 2 % | w/v active ingredient |
| | 49 % | acetone |
| | ca 49 % | water |
| | 0.2 % | Tensiofix AS (Polyethylene oxide alkyl phenol condensation product + anionic dodecyl benzene sulfonate). Also contains small and unspecified amounts of n-butanol + $CCl_4$. |

Results

| R | Formulation | % Kill (relative to control) |
|---|---|---|
| phenyl | (a) | 100 |
| phenyl (hydrochloride) | (b) | 100 |
| 3-chlorophenyl | (b) | 100 |
| 3-pyridyl | (b) | 90 |
| 4-tolyl | (b) | 100 |
| 4-chlorophenyl | (b) | 90 |
| 4-methoxyphenyl | (b) | 80 |

EXAMPLE 4

The pre-emergence herbicidal activity against a variety of weeds and crop tolerance to 2-phenyl-7-oxa-3-thia-1azaspiro[5.5]undec-1-ene hydrochloride is presented in the table below. Plant preparation was the same as in the preceding example. The spray volume was 1000 l./hectare using the wettable powder 25 weight % formulation (appropriately diluted to the dosages shown below) from example 3. Assessment of activity was made 4 weeks after treatment.

| Plant | % Injury relative to Untreated | |
|---|---|---|
| | 5 kg/ha | 1.25 kg/ha |
| Barley | 0 | 0 |
| Rice | 5 | 0 |
| Sorghum | 0 | 0 |
| Onion | 10 | 0 |
| Sunflower | 0 | 0 |
| Cucumber | 0 | 0 |
| Cotton | 0 | 0 |
| Flax | 20 | 10 |
| Peanut | 0 | 0 |
| Potato | 0 | 0 |
| Sugarbeet | 0 | — |
| Soyabean | 0 | — |
| Agrostis stolonifera | 100 | 100 |
| Apera spica-venti | 100 | 100 |
| Digitaria sanguinalis | 100 | 95 |
| Panicum capillare | 100 | 100 |
| Setaria glauca | 90 | 70 |

We claim:
1. A compound of the formula

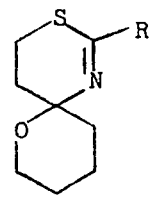

wherein R is phenyl; phenyl monosubstituted with a chloro, lower alkyl or lower alkoxy group; or pyridyl; and the acid addition salts thereof.

2. The compound of claim 1 wherein R is phenyl, and the hydrochloride thereof.

3. The compound of claim 1 wherein R is 3-chlorophenyl.

4. The compound of claim 1 wherein R is 4-chlorophenyl

5. The compound of claim 1 wherein R is 4-methylphenyl.

6. The compound of claim 1 wherein R is 4-methoxyphenyl.

7. The compound of claim 1 wherein R is 3-pyridyl.

* * * * *